United States Patent
Muthiah et al.

(10) Patent No.: US 11,010,057 B2
(45) Date of Patent: *May 18, 2021

(54) STORAGE SYSTEM AND METHOD FOR STORAGE SYSTEM CALIBRATION

(71) Applicant: Western Digital Technologies, Inc., San Jose, CA (US)

(72) Inventors: Ramanathan Muthiah, Bangalore (IN); Ramkumar Ramamurthy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,483

(22) Filed: May 29, 2019

(65) Prior Publication Data

US 2020/0379643 A1    Dec. 3, 2020

(51) Int. Cl.
  *G06F 9/345*   (2018.01)
  *G06F 3/06*    (2006.01)
  *G06F 12/02*   (2006.01)

(52) U.S. Cl.
  CPC ............. *G06F 3/061* (2013.01); *G06F 3/064* (2013.01); *G06F 3/0656* (2013.01); *G06F 3/0688* (2013.01); *G06F 12/0246* (2013.01); *G06F 9/345* (2013.01); *G06F 2212/7201* (2013.01)

(58) Field of Classification Search
  None
  See application file for complete search history.

(56) References Cited

U.S. PATENT DOCUMENTS

| | | |
|---|---|---|
| 2015/0143029 A1 | 5/2015 | Sivasankaran et al. |
| 2015/0278004 A1 | 10/2015 | Li et al. |
| 2018/0067961 A1 | 3/2018 | Yang et al. |
| 2018/0293174 A1 | 10/2018 | Jong et al. |
| 2019/0056881 A1 | 2/2019 | Feldman et al. |

OTHER PUBLICATIONS

International Search Report and Written Opinion in Application No. PCT/US2019/067382, dated Apr. 2, 2020, 12 pages.

(Continued)

*Primary Examiner* — Brian R Peugh
(74) *Attorney, Agent, or Firm* — Brinks Gilson & Lione

(57) ABSTRACT

A storage system, host, and method for storage system calibration are provided. In one embodiment, a storage system is provided comprising a memory and a controller. The controller is configured to: determine a pattern of host writes to the memory; determine whether the pattern of host writes matches a granularity of a logical-to-physical address map used by the storage system; and in response to determining that the pattern of host writes does not match the granularity of the logical-to-physical address map used by the storage system, change the granularity of the logical-to-physical address map used by the storage system. In another embodiment, the storage system calibration is done by host directive. Other embodiments are provided.

20 Claims, 7 Drawing Sheets

(56) References Cited

OTHER PUBLICATIONS

Lee et al., "µ-FTL: A Memory-Efficient Flash Translation Layer Supporting Multiple Mapping Granularities", Proceedings of the 8$^{th}$ ACM international conference on Embedded software; pp. 21-30, dated Oct. 31, 2008, Korea Advanced Institute of Science and Technology (KAIST), Daejeon 305701, Korea, obtained from the Internet at URL: <https://dl.acm.org/doi/pdf/10.1145/1450058.1450063>, 11 pages.

International Search Report and Written Opinion in Application No. PCT/US2019/067471, dated Apr. 6, 2020, 12 pages.

Park et al.; "A Re-configurable FTL (Flash Translation Layer) Architecture for NAND Flash based Applications"; 18$^{th}$ IEEE/IFIP International Workshop on Rapid System Prototyping (RSP'07); 2007; 7 pages.

Park et al.; "A Reconfigurable FTL (Flash Translation Layer) Architecture for NAND Flash-Based Applications"; ACM Transactions on Embedded Computing Systems, vol. 7, No. 4, Article 38; Jul. 2008; 23 pages.

Feng et al.; "Mapping Granularity Adaptive FTL Based on Flash Page Re-programming"; IEEE InDesign, Automation & Test in Europe Conference & Exhibition; 2017; pp. 374-379.

Hao Lv et al.; "Exploiting Minipage-level Mapping to Improve Write Efficiency of NAND Flash"; In2018 IEEE International Conference on Networking, Architecture and Storage (NAS); 2018; 10 pages.

Zhou et al.; "Exploiting Mini Page-level Mapping to Solve the Size Discrepancy of I/O Requests and Flash Pages"; Huazhong University of Science and Technology, Wuhan National Laboratory for Optoelectronics; Aug. 2016; 18 pages.

Park et al.; "A Dynamic Switching Flash Translation Layer based on Page-Level Mapping"; IEICE Transactions on Information and Systems, 2016, vol. 99, No. 6, pp. 1502-1511; obtained from the Internet at URL: https://www.jstage.jst.go.jp/article/transinf/E99.D/6/E99.D_2015EDP7406/_pdf dated Jun. 6, 2016; 10 pages.

STORAGE SYSTEM AND METHOD FOR STORAGE SYSTEM CALIBRATION

BACKGROUND

Storage systems can come in a variety of forms and have a variety of performance characteristics. For example, Secure Digital (SD) cards with the same form factor can have various performance metrics for different product lines, such as Surveillance, Mobile Hosts, Gaming Hosts, and Video Speed Class. Each of these product lines has a different configuration in terms of memory and firmware binaries according to the specification for its produce line. Each of these product lines support storage of all types of data, but a given product line may be optimized for some data pattern, usually at the expense of other data patterns, due to the storage system's internal flash translation layer (FTL) design (i.e., its logical-to-physical address (L2P) map and allotted cache memory). For example, SD cards marketed as Video Speed Class (VSC) may be suboptimal for use with short, unaligned types of data. Similarly, SD cards marketed with increased random performance may be suboptimal for use with sequential data. Accordingly, a given storage system may not be tuned to perform optimally for all data patterns.

DETAILED DESCRIPTION

Overview

Figure 1A:
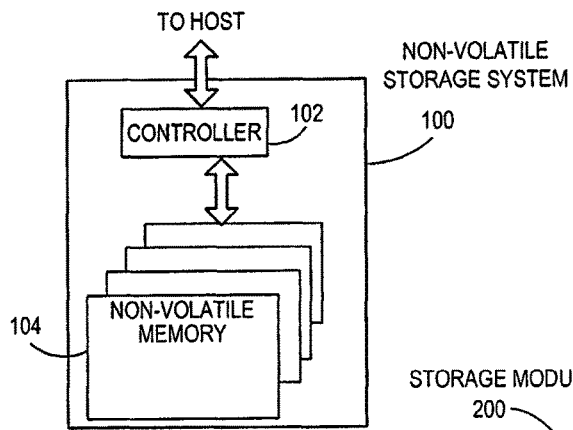
FIG. 1A is a block diagram of a non-volatile storage system of an embodiment.

By way of introduction, the below embodiments relate to a storage system and method for storage system calibration. In one embodiment, a storage system is provided comprising a memory and a controller. The controller is configured to: determine a pattern of host writes to the memory; determine whether the pattern of host writes matches a granularity of a logical-to-physical address map used by the storage system; and in response to determining that the pattern of host writes does not match the granularity of the logical-to-physical address map used by the storage system, change the granularity of the logical-to-physical address map used by the storage system.

In some embodiments, changing the granularity of the logical-to-physical address map comprises making the logical-to-physical address map coarser.

In some embodiments, making the logical-to-physical address map coarser comprises: performing host data consolidation; managing new write entries as a delta file until a coarser logical-to-physical address map is complete; and flushing the coarser logical-to-physical address map to the memory.

In some embodiments, changing the granularity of the logical-to-physical address map comprises making the logical-to-physical address map finer.

In some embodiments, making the logical-to-physical address map finer comprises: splitting the logical-to-physical address map into finer entries; managing new write entries as a delta file until the splitting is complete; and flushing the split logical-to-physical address map to the memory.

In some embodiments, the controller is further configured to determine whether the pattern of host writes matches the current granularity of the logical-to-physical address map used by the storage system in response to a number of host writes in the pattern exceeding a threshold and/or in response to a positive health determination of the memory.

In some embodiments, the pattern of host writes to the memory is determined in runtime across a plurality of write cycles.

In some embodiments, the memory comprises a three-dimensional memory.

In some embodiments, the storage system is embedded in a host.

In some embodiments, the storage system is removably connected to a host.

In another embodiment, a method is provided that is performed in a storage system comprising a memory, wherein the storage system is in communication with a host. The method comprises: tracking host writes to the memory; determining whether a media management layer used by the storage system results is more sequential-type results or more random-type results than the host writes; in response to determining that the media management layer used by the storage system results in more sequential-type results, making translation mapping performed by the media management layer coarser; and in response to determining that the media management layer used by the storage system results in more random-type results, making translation mapping performed by the media management layer finer.

In some embodiments, making translation mapping performed by the media management layer coarser comprises: consolidating host data; managing new write entries as a delta file until a coarser media management layer is complete; and flushing the coarser media management layer to the memory.

In some embodiments, making translation mapping performed by the media management layer finer comprises: splitting the media management layer into finer entries; managing new write entries as a delta file until the splitting is complete; and flushing the split media management layer to the memory.

In some embodiments, the method further comprises determining that a number of tracked host writes exceeds a threshold and/or making a positive health determination of the memory.

In some embodiments, the tracking is determined in runtime across a plurality of write cycles.

In another embodiment, a storage system is provided comprising: a memory; means for determining a pattern of host writes to the memory; means for determining whether the pattern of host writes matches a granularity of a logical-to-physical address map used by the storage system; and means for in response to determining that the pattern of host writes does not match the granularity of the logical-to-physical address map used by the storage system, changing the granularity of the logical-to-physical address map used by the storage system.

In some embodiments, means for changing the granularity of the logical-to-physical address map comprises means for making the logical-to-physical address map coarser.

In some embodiments, means for changing the granularity of the logical-to-physical address map comprises means for making the logical-to-physical address map finer.

In some embodiments, the storage system further comprises means for determining whether the pattern of host writes matches the current granularity of the logical-to-physical address map used by the storage system in response to a number of host writes in the pattern exceeding a threshold and/or in response to a positive health determination of the memory.

In some embodiments, the pattern of host writes to the memory is determined in runtime across a plurality of write cycles.

In another embodiment, a host is provided comprising a controller configured to: determine a pattern of host writes to a memory of a storage system in communication with the host; determine whether the pattern of host writes matches a granularity of a logical-to-physical address map used by the storage system; and in response to determining that the pattern of host writes does not match the granularity of the logical-to-physical address map used by the storage system, directing the storage system to change the granularity of the logical-to-physical address map used by the storage system.

In some embodiments, changing the granularity of the logical-to-physical address map comprises making the logical-to-physical address map coarser.

In some embodiments, making the logical-to-physical address map coarser comprises: performing host data consolidation; managing new write entries as a delta file until a coarser logical-to-physical address map is complete; and flushing the coarser logical-to-physical address map to the memory.

In some embodiments, changing the granularity of the logical-to-physical address map comprises making the logical-to-physical address map finer.

In some embodiments, making the logical-to-physical address map finer comprises: splitting the logical-to-physical address map into finer entries; managing new write entries as a delta file until the splitting is complete; and flushing the split logical-to-physical address map to the memory.

In some embodiments, the controller is further configured to receive an indication from the storage system that the storage system rejected the direction from the host to change the granularity of the logical-to-physical address map used by the storage system.

In some embodiments, the controller is further configured to determine whether the pattern of host writes matches the current granularity of the logical-to-physical address map used by the storage system in response to a number of host writes in the pattern exceeding a threshold and/or in response to a positive health determination of the memory.

In some embodiments, the pattern of host writes to the memory is determined in runtime across a plurality of write cycles.

In some embodiments, the memory comprises a three-dimensional memory.

In some embodiments, the storage system is embedded in the host.

In some embodiments, the storage system is removably connected to the host.

In another embodiment, a method for storage system calibration is provided that is performed in a host in communication with a storage system comprising a memory. The method comprises: tracking host writes to the memory; determining whether a media management layer used by the storage system results is more sequential-type results or more random-type results than the host writes; in response to determining that the media management layer used by the storage system results in more sequential-type results, instructing the storage system to make translation mapping performed by the media management layer coarser; and in response to determining that the media management layer used by the storage system results in more random-type results, instructing the storage system to make translation mapping performed by the media management layer finer.

In some embodiments, making translation mapping performed by the media management layer coarser comprises: consolidating host data; managing new write entries as a delta file until a coarser media management layer is complete; and flushing the coarser media management layer to the memory.

In some embodiments, the method further comprises making translation mapping performed by the media management layer finer comprises: splitting the media management layer into finer entries; managing new write entries as a delta file until the splitting is complete; and flushing the split media management layer to the memory.

In some embodiments, the method further comprises determining that a number of tracked host writes exceeds a threshold and/or making a positive health determination of the memory.

In some embodiments, the method further comprises receiving an indication from the storage system that the storage system rejected the instruction from the host to make the media management layer finer.

In some embodiments, the tracking is determined in runtime across a plurality of write cycles.

In another embodiment, a host is provided comprising: means for determining a pattern of host writes to a memory of a storage system in communication with the host; means for determining whether the pattern of host writes matches a granularity of a logical-to-physical address map used by the storage system; and means for in response to determining that the pattern of host writes does not match the granularity of the logical-to-physical address map used by the storage system, directing the storage system to change the granularity of the logical-to-physical address map used by the storage system.

In some embodiments, means for changing the granularity of the logical-to-physical address map comprises means for making the logical-to-physical address map coarser.

In some embodiments, means for changing the granularity of the logical-to-physical address map comprises means for making the logical-to-physical address map finer.

In some embodiments, the host further comprises means for receiving an indication from the storage system that the storage system rejected the direction from the host to change the granularity of the logical-to-physical address map used by the storage system.

In some embodiments, the host further comprises means for determining whether the pattern of host writes matches the current granularity of the logical-to-physical address map used by the storage system in response to a number of host writes in the pattern exceeding a threshold and/or in response to a positive health determination of the memory.

In some embodiments, the pattern of host writes to the memory is determined in runtime across a plurality of write cycles.

Other embodiments are possible, and each of the embodiments can be used alone or together in combination. Accordingly, various embodiments will now be described with reference to the attached drawings.

Embodiments

Figure 1B:
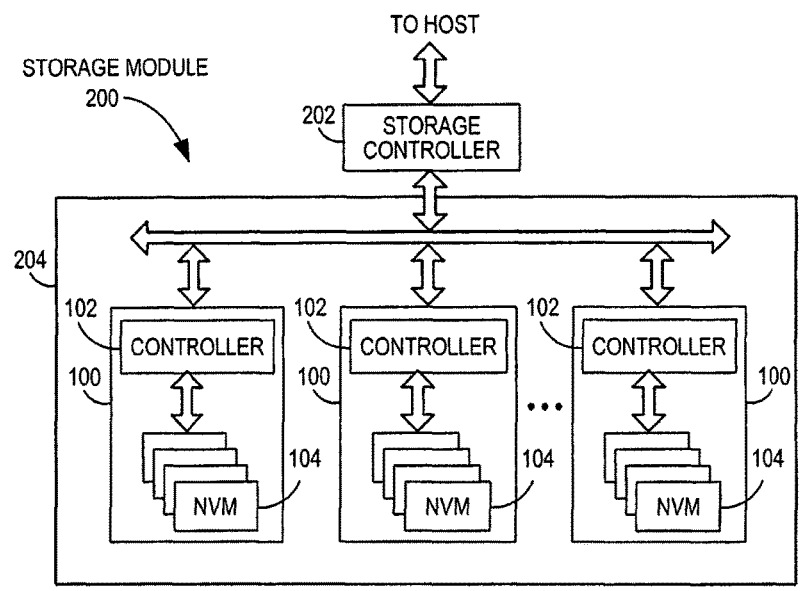
FIG. 1B is a block diagram illustrating a storage module of an embodiment.
Figure 1C:
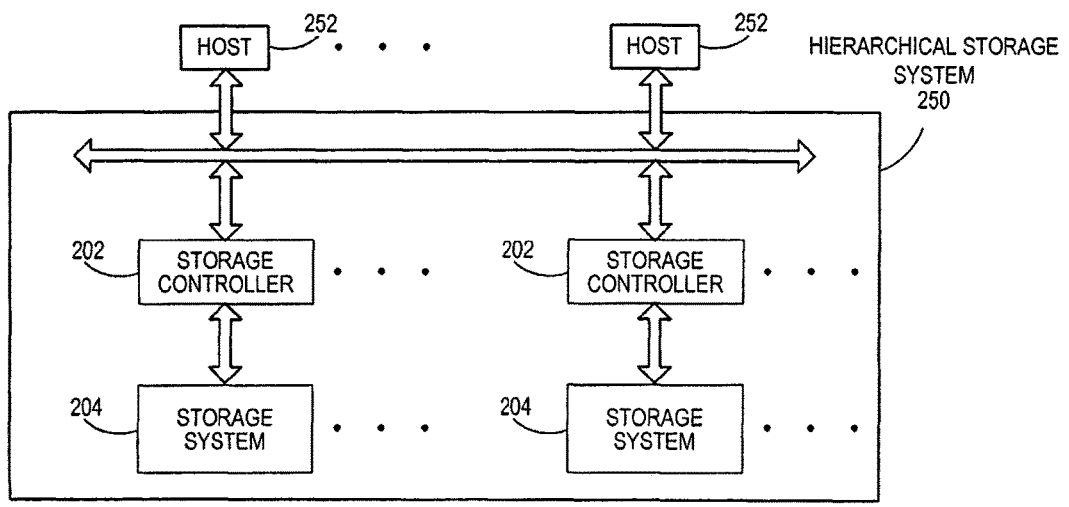
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
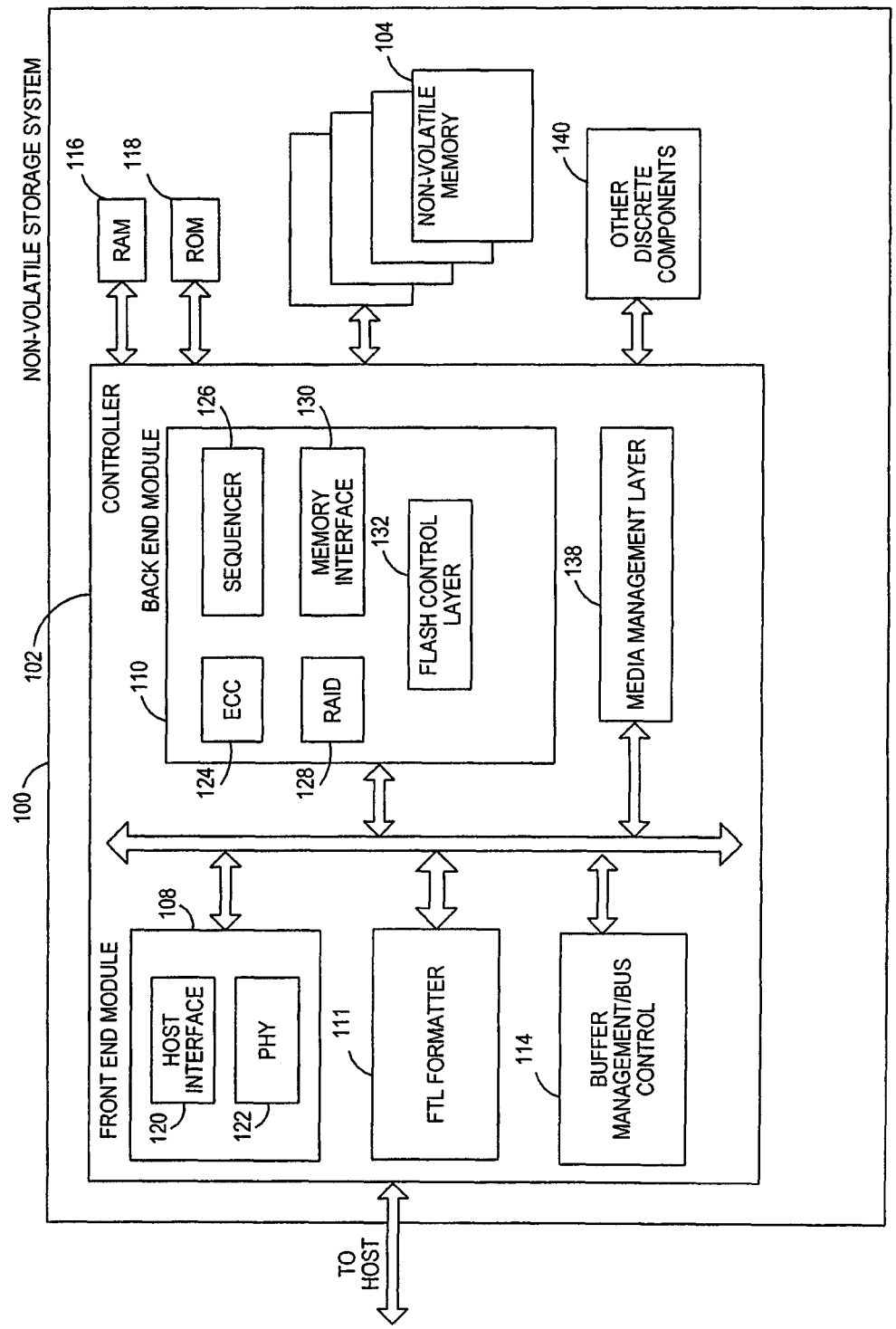
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a flash translation layer (FTL) formatter 111, which is discussed in more detail below, and can be implemented in hardware or software/firmware. The FTL formatter 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
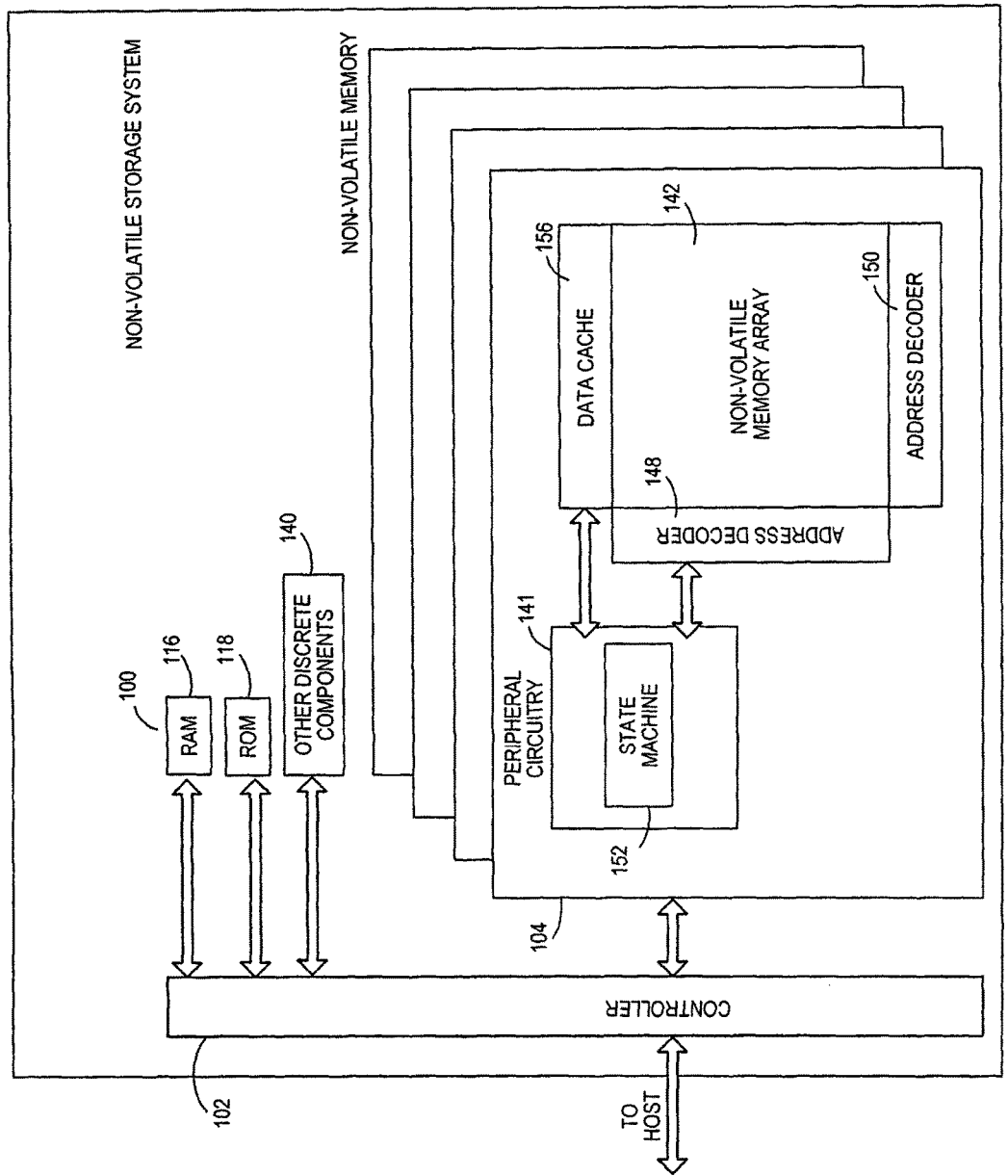
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

The granularity of the logical-to-physical address (L2P) map is typically either pre-set in the factory or chosen prior to run-time of the storage system. The granularity at which the logical-to-physical address (L2P) map is configured may depend on the intended use of the storage system. For example, if the storage system is intended to be used with sequential data (data that is contiguous in the logical address space/not fragmented), a large logical group size (e.g., 4 megabytes (MB)) can be used. Using a large logical group size enables addressing a large amount of data with a single index or entry in both RAM and memory for reducing processing overhead. That is, indexing a large logical group size can maintain the efficiencies gained by fewer entries in the logical-to-physical address table. In contrast, if the storage system is intended to be used with fragmented data, a smaller logical group size (e.g., 4 kilobytes (KB) can be used. That is, for data that is fragmented (not sequential), a large logical group block is not ideal.

As mentioned above, storage systems typically support storage of all types of data, but a storage system may be optimized for some data pattern, usually at the expense of other data patterns. For example, some storage systems may be suboptimal for use with short, unaligned types of data, while other storage systems may be suboptimal for use with sequential data. This is due to the granularity of the storage system's logical-to-physical address map in the FTL. Accordingly, a typical storage systems is optimized for some data patterns, and its behavior with other data patterns is sub-optimal. That is, the in-built FTL system in some storage systems is usually optimal for certain data patterns and not optimal for most others. The retail device serving a product purpose may not be able to satisfy another host (of a completely different type) of its requirement since it is not dynamically configurable.

To address this problem, the following embodiments provide a storage system 100 (sometimes referred to herein as a "device") that can, based on data analysis in runtime, support logical-to-physical (L2P) association at one of a plurality of different logical group granularities (e.g., one sector (512 bytes), 4 KB, 8 KB, 16 KB, or 32 KB). The lower granularities help in increased random performance, and the higher granularities offer higher sequential performance for the same FTL cache. Because the storage system 100 can adapt itself to host use cases based on the data pattern on-the-fly during runtime (and change them throughout the course of operation), the same storage system 100 can be sold in multiple product classes.

Further, the decision to recalibrate the FTL from its default to a newer FTL may or may not involve a full-fledged FTL format in the storage system 100, which directly affects the time taken for such an adjustment. This enables high endurance retail removable storage systems to be usable by multiple types of hosts at different points. The storage system 100 may not want to calibrate the FTL often owing to latency involved. But, having a dynamic way of changing the FTL granularity enables less FTL calibration overhead, optimum FTL cache usage, and optimal performance across several data storage types during the life of the storage system 100. This approach optimizes writes and reads, as well as garbage collection.

So, in these embodiments, the dynamic calibration of the storage system 100 involves the storage system 100 recalibrating the FTL based on learning in accordance with its dynamic usage requirement through the FTL formal (in one embodiment, only the FTL format and not the data format, as existing data is safe and intact). The learning could be based on a history of a threshold number of commands, patterns, or full-fledged data analysis across a configurable threshold number of storage system 100 cycles.

Figure 3:
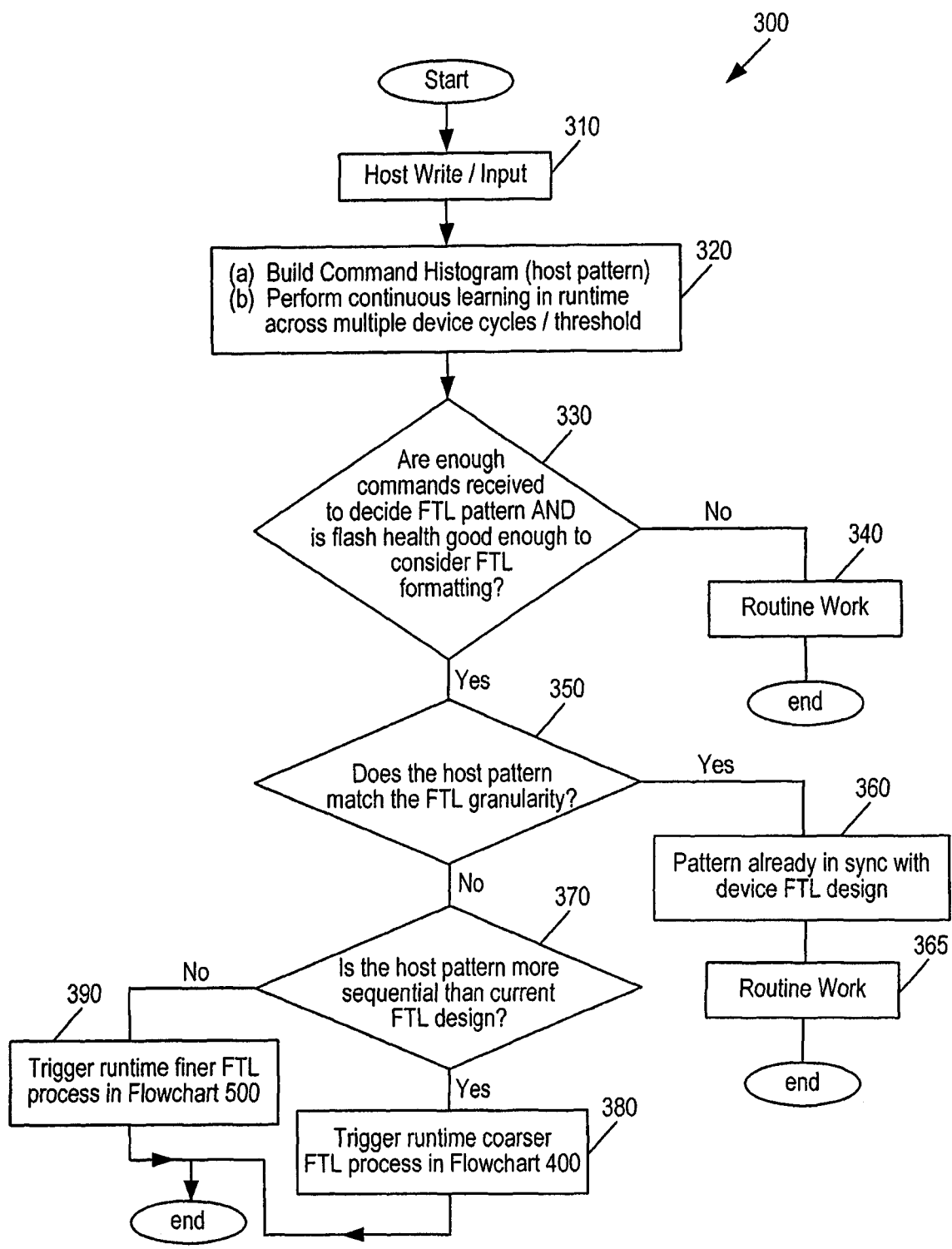
FIG. 3 is a flowchart 300 of a method an embodiment for runtime learning and FTL formatting.

The following paragraphs and FIGS. 3-6 illustrate an example of an embodiment. It should be noted that this is merely an example and other implementation can be used. Turning now to FIG. 3, FIG. 3 is a flowchart 300 of a method of an embodiment for runtime learning and FTL formatting. As shown in FIG. 3, the storage system 100 receives a host write or input during runtime of the storage system (act 310) and (a) builds a command histogram and (b) performs continuous learning in "runtime" across multiple device cycles/threshold (act 320). In this way, the storage system 100 continuously monitors the data being accessed by the host. During this process, the storage system 100 determines if there have been enough commands received to decide on a FTL pattern and/or if the memory 104 (here, flash) health is good enough to consider FTL formatting (act 330). The number of commands can be a number chosen to represent a robust data set. The health of the memory 104 can be determined in any suitable way. For example, in one embodiment, the health of the memory 104 is determined by a number of read/write/erase cycles the memory 104 has endured. For instance, if the memory 104 has an expected lifetime of 1,000 cycles, and the memory 104 has already gone through 900 cycles, the memory 104 may be considered "end of life," where it would not be worth the time and effort to reformat the FTL.

If the answer to those inquires is no, the storage system 100 continues with its "routine" work using the existing FTL (act 340). However, if the answer to those inquires is yes, the storage system 100 then determines if the threshold history pattern matches the FTL granularity (act 350). For example, the storage system 100 can look for some pattern, such as Video Speed Class patterns, in the storage system 100 over a threshold number of device cycles. If the storage system 100 determines the threshold history pattern matches the FTL granularity, the storage system 100 determines that the pattern is already in sync with the storage system's FTL design (act 360) and proceeds with its "routine" work with the existing FTL (act 365).

However, if the storage system 100 determines the threshold history pattern does not match the FTL granularity, the storage system 100 determines if the host pattern is more sequential than the current FTL design (act 370). If it is, the storage system 100 triggers a "runtime coarser FTL process," which is shown in the flowchart 400 in FIG. 4. If it is not, the storage system 100 triggers a "runtime finer FTL process," which is shown in the flowchart 500 in FIG. 5. That is, if it turns out that the default FTL is more towards sequential data, but the write pattern from the host has been random data for a long time (e.g., many flash cycles), such as with gaming hosts, then a finer FTL is preferred.

Figure 4:
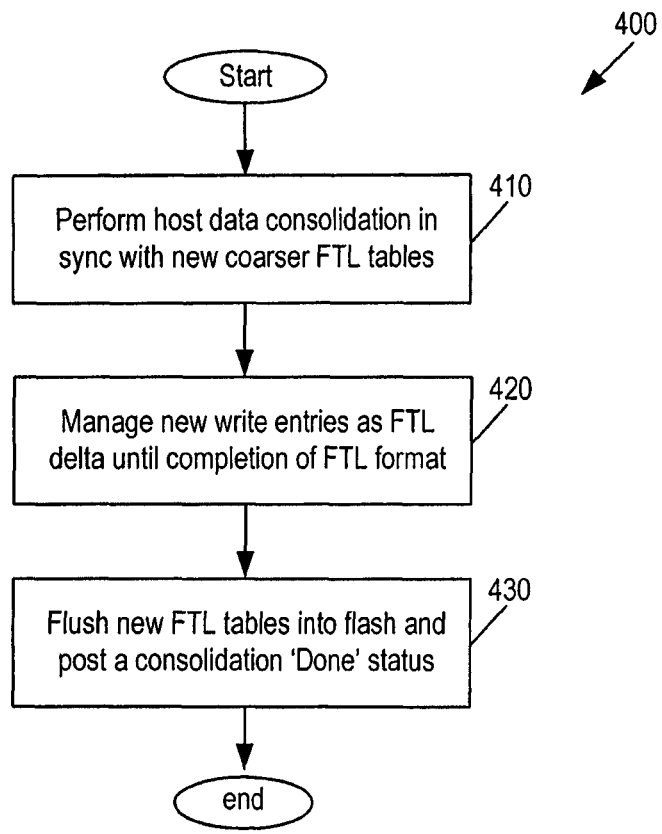
FIG. 4 is a flowchart of a runtime coarser flash translation later (FTL) process of an embodiment.

Turning now to FIG. 4, FIG. 4 is a flowchart 400 of a "runtime coarser FTL process" of an embodiment. As shown in FIG. 4, in this process, the storage system 100 performs host data consolidation (i.e., host data movement) in sync with new, coarse FTL tables (act 410). For example, garbage collection can be used to compact data. Next, the storage system 100 manages new write entries as an "FTL delta" until completion of the FTL format (act 420). An FTL delta is used to manage intermediate data flow during runtime. Finally, the storage system 100 flushes the new FTL tables in the memory (flash) and posts a "done" status (act 430). As shown by this example, a decision to go coarser compared to a default FTL association (say from a default sector level to a new 4K level, or even more further, to a 16K or 32K level) would result in less FTL entries, hence a smaller FTL block budget. However, going coarser involves host data movement, as host data desegregation is required to adjust for new FTL links. This mode is comparatively more suitable for sequential data (compared to sector level association). Since the storage system 100 is aware of the pattern, it can afford to release some of the FTL blocks to improve device performance.

Figure 5:
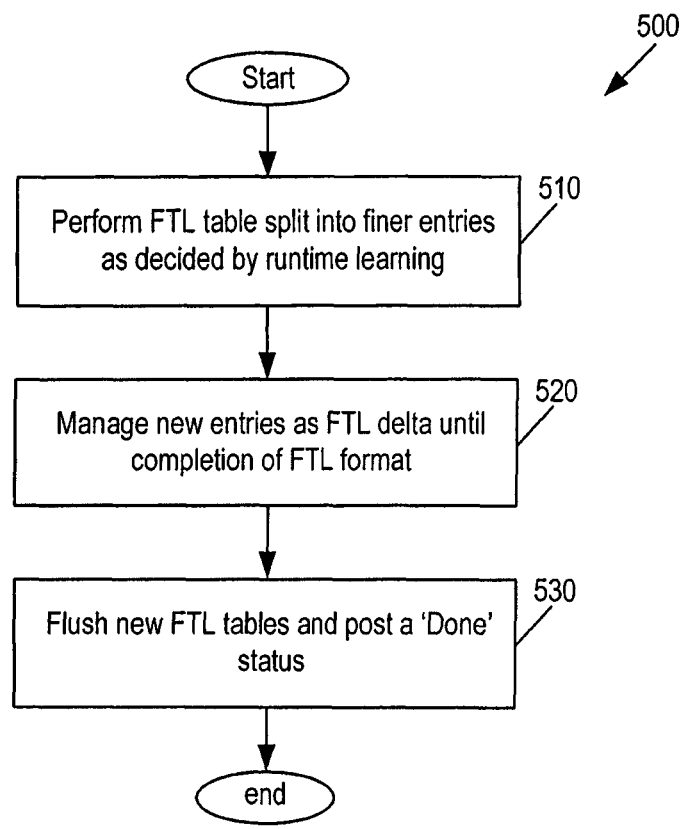
FIG. 5 is a flowchart of a runtime finer FTL process of an embodiment.

Turning now to FIG. 5, FIG. 5 is a flowchart 500 of a "runtime finer FTL process" of an embodiment. As shown in FIG. 5, the storage system 100 performs an FTL table split into finer entries as decided by runtime learning (act 510). Next, the storage system 100 manages new entries as an FTL delta until the completion of the FTL format (act 520). Finally, the storage system 100 flushes the new FTL tables and posts a "done" status (act 530). As shown in this example, a decision to calibrate to a finer FTL (e.g., new associations at the sector level from a default 4K level; or say, to finer 4K from 32K) would involve additions of new FTL updates alone, but no host data movement in the memory 104, since the data is desegregated owing to a coarser default FTL association. In the case of new, finer FTL, the existing FTL logical-to-physical association is split, which increases the number of entries. Increased FTL pages leads to an increased block budget for the FTL. The finer possible FTL calibration defines the worst case FTL block budget in the storage system 100, which can be used as overprovisioning blocks when the FTL is calibrated to be coarser. Further, because going to finer FTL does not require host data movement, the storage system 100 can perform such an operation with a spread ratio that is phased within protocol time-out limits. It should be noted that the "protocol time-out limits" mentioned above are applicable both for going to coarser or finer FTL. Some work may be performed in both cases, such as in a phased manner.

Consider the following examples. Assuming the FTL page size to be fixed at 4 KB, consider the logical block granularity at 4 KB, one FTL page has 1,024 L2P entries, each entry being 4 bytes. At a 4 KB data flash management unit (FMU) granularity, 1,024 entries will cover 4 MB of logical region. So, in a 4 KB RAM, one FTL pages covers a total of 4 MB of logical data. Accordingly, finer granularity occupies more FTL space and giving better random performance. In another example, the change in granularity is from a 4 KB logical block to a 32 KB logical block, where the FTL page size is still 4 KB. Again, one FTL page is 1,024 L2P entries, each entry being 4 bytes. So, the FTL page size is 4 KB. At a 32 KB data FMU granularity, 1,024 entries will cover 32 MB of logical region. So, in a 4 KB RAM, one FTL page covers a total of 32 MB of logical data. Accordingly, coarser granularity occupies lesser FTL space, giving better sequential performance.

It should be noted that different jumps in calibration levels from the current default may result in different latencies and depend on the amount of data present in the storage system 100. As such, the storage system 100 may not want to calibrate FTL often, owing to the latency involved. But, it opens up a way where retail storage systems, such as SD cards, can be used across multiple hosts having different types of requirements, such as Surveillance, Mobile Hosts, gaming, and low-end camera hosts operating under the Video Speed Class specification. These embodiments enable less FTL calibration overhead and optimal performance across several data storage types. Optimum usage of the FTL RAM cache minimizes hardware cost.

In the above examples, the storage system 100 made the determination as to whether to change the FTL. In another embodiment, the storage system 100 performs FTL formatting based on a host directive, where the decision to recalibrate is taken as a result of learning/requirements at the host side. For example, the host (e.g., a controller in the host) might decide to perform FTL format/recalibration when the data pattern is not optimally in sync with the storage environment and/or if the value proposition is in favor. The host can be provided with a table of possible calibrations which the underlying firmware or hardware can support in the storage system 100, and the host can decide on the right logical-to-physical address association to use based on current as well as future needs after assessing the value proposition for a given FTL format latency. This embodiment may involve a handshake and protocol standardization between the host and the storage system 100, and the storage system 100 may have the option to reject the host directive.

Figure 6:
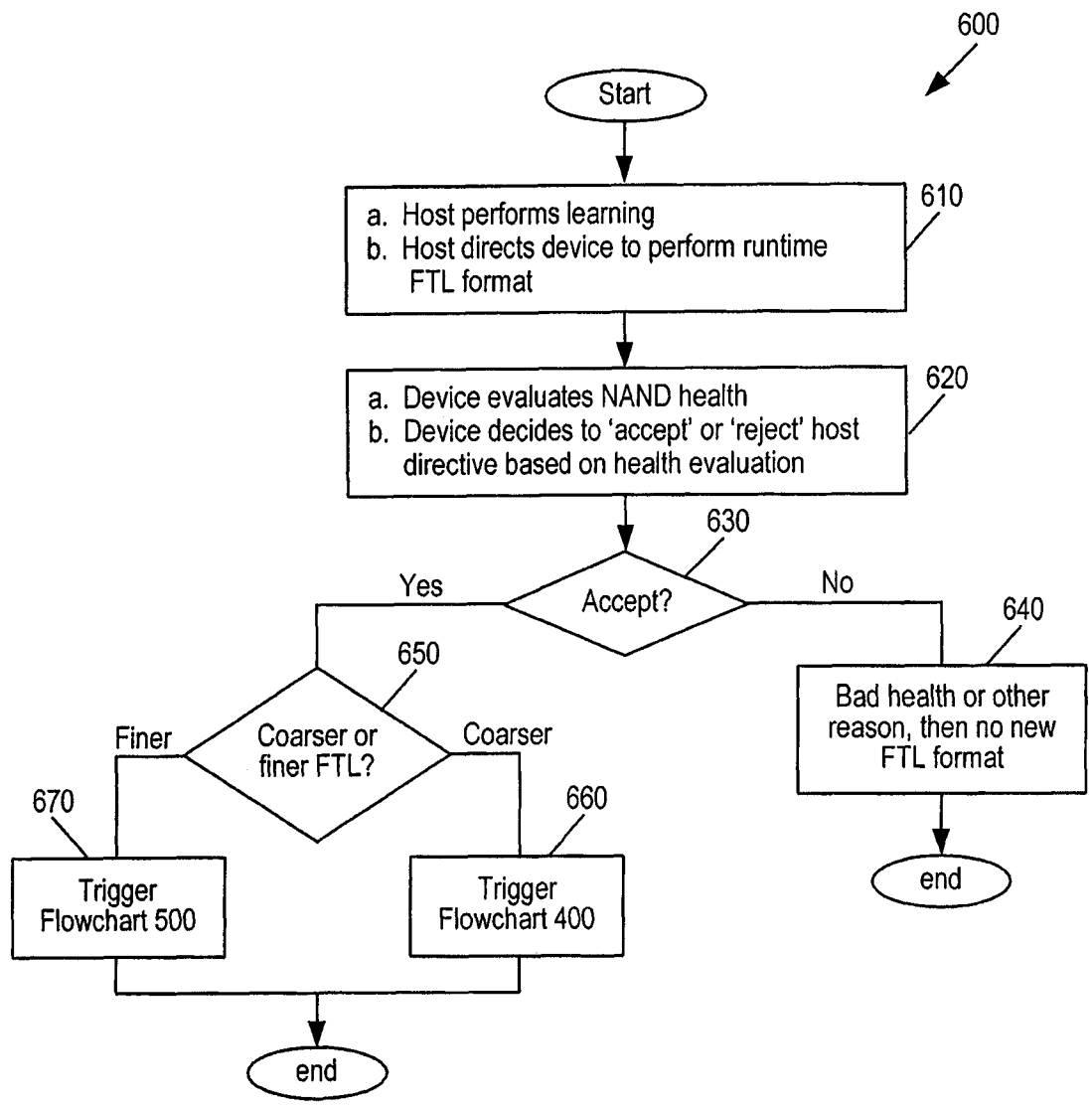
FIG. 6 is a flowchart of a method of an embodiment performed by a host for storage system calibration.

Turning again to the drawings, FIG. 6 is a flowchart 600 of this embodiment. As shown in FIG. 6, the host (a) performs learning and (b) directs the storage system 100 to perform runtime FTL formatting (act 610). The storage system 100 evaluates the memory (here, NAND flash) health and (b) decides to "accept" or "reject" the host directive based on the health evaluation (act 620). If the storage system 100 decides not to accept the host directive (act 630), the host knows that the memory is in bad health (or due to other reasons), and no new FTL format will be used (act 640). If the storage system 100 decides to accept the host directive (act 630), the storage system 100 then determines if a coarser or finer FTL is needed (act 650). If a coarser FTL is needed, the storage system 100 triggers the "runtime coarser FTL process" shown in the flowchart 400 in FIG. 4 (act 660). If a finer FTL is needed, the storage system 100 triggers the "runtime finer FTL process" shown in the flowchart 500 in FIG. 5 (act 670).

There are several advantages associated with these embodiments. For example, one advantage is that the FTL granularity can be dynamically changed (e.g., a 4 byte physical address may point to 4 KB logical data in one FTL configuration, and the same 4 byte may point to 32 KB logical data in another FTL configuration). So, RAM can be efficiently used by the storage system 100, among other advantages. As another advantage, the storage system 100 can dynamically define the retail storage system market based on the underlying data pattern to extract the best performance as well as optimize FTL cache and block usages. Further, the storage system 100 can adapt itself to the host use case based on the data pattern, so that the same storage system 100 can be sold to multiple product classes. Yet another advantage is that the storage system 100 start-up and garbage collection time can be lowered considerably with these embodiments. Additionally, as a byproduct of learning, since the storage system 100 has prior information on the nature of data that is being stored, it can adjust its resources according to optimize various performances. For example, by changing its FTL caching policy according to a chosen FTL granularity, the storage system 100 can enable cache and block resources to be used elsewhere in the system leading to enhanced performance. As another example, the extra blocks that are gained from coarser FTL calibration can be used for capacity overprovisioning or for burst performance if it turns out that the analysis is mostly sequential biased in the storage system.

It should be noted that these embodiments can be used in conjunction with storage systems that uses a layered architecture approach, such as the one described in U.S. Patent Application Publication No. US 2015/0143029A1, which is hereby incorporated by reference. In the case of layered architecture, both the FTL directory and FTL sub-page granularity can be formatted in run-time to a new value leading to a one-time FTL table re-arrangement for both directory and sub-pages through garbage collection. In the case of a non-layered FTL architecture, the single level of granularity can be formatted to a newer value at runtime. The FTL can be modified in real time (e.g., in the 10th cycle of storage system usage in a 500 cycle endurance product). FTL formatting can lead to table changes and may or may not lead to host data movement. During real-time FTL formatting, the host data can be saved in the storage system's memory as delta mapping with corresponding run-lengths to avoid confusion as well as to avoid data loss. The decision can be made during the life of the storage system after sufficient learning to avoid FTL choking (i.e., unnecessary frequent overheads with FTL formatting). Since the decision is run-time, any format may lead to extra garbage collection work. As a policy, when the FTL format work is incomplete, a new decision to reformat can be put on hold to avoid device choking.

To describe an example, consider U.S. Patent Application Publication No. US 2015/0143029A1, which describes a layered architecture, a global address table (GAT) directory covering 4 MB, and GAT pages (split for random data within that directory) covering 4 KB. For the same example case, based on learning from a pattern or a host directive, the storage system can change the GAT directory in runtime to cover 32 MB of logical region and change the corresponding GAT page to cover 32 KB of data somewhere in the middle of device's life (e.g., the 10th cycle of product, learning from first 9 cycles).

In this case, the new chosen granularity has become coarser. Along with FTL changes, the host data would have to be relocated to complete the FTL format procedure. Until that point of FTL format completion, the FTL can be stored in memory as an FTL delta without any dependency on the tables to avoid confusion. Once the format is complete, the FTL delta entries can be merged back to the newly-created FTL tables.

In the case of choosing finer granularity (e.g., through learning), the host data need not be moved, but FTL new tables are created in an extended FTL block budget (a finer FTL table would need a greater block budget). Until the creation of the new FTL tables in extended blocks, any new logical-to-physical updates can be done as an FTL delta and stored in memory without being merged to the main FTL tables.

As and when the memory's health deteriorates, some storage systems may not want to perform FTL formatting owing to larger background time involved and lower return on investment. So, effectively the storage system may reject a host directive keeping in mind the garbage collection workload, ongoing FTL format, or memory health to avoid choking.

In summary, the embodiments presented here can change the storage system's FTL according to a real-time pattern to enhance performance with random or sequential writes. This provides advantages for a given memory's use in multiple products with the same form factor. FTL formatting may mean only FTL changes in some cases and may include host data movement and sometimes idle-time control movement. Learning the real-time pattern can be done over a certain number of cycles. These embodiments can decide when to calibrate and when not to calibrate to avoid choking caused by unnecessary calibration. These embodiments can use protocol standardization for host-side learning. Different FTL caching policies can be used to optimize caches, and different latencies can be used for different amounts of data, as latency and the value proposition can depend on how much data is written in a cycle. Resource adjustments in the memory can be enabled as a byproduct of FTL learning, which can lead to power savings.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a memory; and
a controller in communication with the memory, wherein the controller is configured to:
analyze a history of a plurality of prior write commands received from a host to determine whether the plurality of prior write commands comprise a majority of sequential write commands or a majority of random write commands;
determine whether a granularity of a logical-to-physical address map used by the storage system is optimized for sequential write commands or for random write commands;
in response to determining that the history of the plurality of prior write commands does not match the granularity of the logical-to-physical address map used by the storage system, change the granularity of the logical-to-physical address map used by the storage system to a different granularity; and
receive a new write command from the host, wherein the different granularity does not necessarily match the new write command because the different granularity was changed based on the history of the plurality of prior write commands and not based on the new write command.

2. The storage system of claim 1, wherein changing the granularity of the logical-to-physical address map comprises making the logical-to-physical address map coarser.

3. The storage system of claim 2, wherein making the logical-to-physical address map coarser comprises:
consolidating host data;
managing new write entries as a delta file until a coarser logical-to-physical address map is complete; and
flushing the coarser logical-to-physical address map to the memory.

4. The storage system of claim 1, wherein changing the granularity of the logical-to-physical address map comprises making the logical-to-physical address map finer.

5. The storage system of claim 4, wherein making the logical-to-physical address map finer comprises:
splitting the logical-to-physical address map into finer entries;
managing new write entries as a delta file until the splitting is complete; and
flushing the split logical-to-physical address map to the memory.

6. The storage system of claim 1, wherein the controller is further configured to analyze the history in response to a number of the prior write commands exceeding a threshold and/or in response to a positive health determination of the memory.

7. The storage system of claim 1, wherein the controller is further configured to analyze the history in runtime across a plurality of write cycles.

8. The storage system of claim 1, wherein the memory comprises a three-dimensional memory.

9. The storage system of claim 1, wherein the storage system is configured to be embedded in a host.

10. The storage system of claim 1, wherein the storage system is configured to be removably connected to a host.

11. A method for storage system calibration, the method comprising:
performing the following in a storage system comprising a memory, wherein the storage system is in communication with a host:
analyzing a plurality of write commands sent to the storage system to determine whether the plurality of prior write commands comprise a majority of sequential write commands or a majority of random write commands;
determining whether a media management layer used by the storage system is optimized for sequential write commands or for random write commands;
in response to determining that the media management layer used by the storage system is optimized for random write commands but that the plurality of prior write commands comprise a majority of sequential write commands, instructing the storage system to make translation mapping performed by the media management layer coarser;
in response to determining that the media management layer used by the storage system results is optimized for sequential write commands but that the plurality of prior write commands comprise a majority of random write commands, instructing the storage system to make translation mapping performed by the media management layer finer; and sending a new write command to the storage system, wherein the instructed granularity does not necessarily match the new write command because the instructed granularity was changed based on a history of the plurality of prior write commands and not based on the new write command.

12. The method of claim 11, wherein making translation mapping performed by the media management layer coarser comprises:

consolidating host data;

managing new write entries as a delta file until a coarser media management layer is complete; and flushing the coarser media management layer to the memory.

13. The method of claim 11, wherein making translation mapping performed by the media management layer finer comprises:

splitting the media management layer into finer entries;

managing new write entries as a delta file until the splitting is complete; and flushing the split media management layer to the memory.

14. The method of claim 11, further comprising determining that the plurality of write commands exceeds a threshold and/or making a positive health determination of the memory.

15. The method of claim 11, wherein the analyzing is performed in runtime across a plurality of write cycles.

16. A storage system comprising:

a memory;

means for analyzing a history of a plurality of prior write commands sent from the host to a storage system to determine whether the plurality of prior write commands comprise a majority of sequential write commands or a majority of random write commands;

means for determining whether a granularity of a logical-to-physical address map used by the storage system is optimized for sequential write commands or for random write commands;

means for directing, in response to determining that the history of the plurality of prior write commands does not match the granularity of the logical-to-physical address map used by the storage system, the storage system to change the granularity of the logical-to-physical address map used by the storage system to a different granularity; and means for sending a new write command to the storage system, wherein the different granularity does not necessarily match the new write command because the different granularity was changed based on the history of the plurality of prior write commands and not based on the new write command.

17. The storage system of claim 16, further comprising means for making the logical-to-physical address map coarser.

18. The storage system of claim 16, further comprising means for making the logical to physical address map finer.

19. The storage system of claim 16, wherein the analyzing is performed in response to a number of the prior write commands exceeding a threshold and/or in response to a positive health determination of the memory.

20. The storage system of claim 16, wherein the analysis is performed in runtime across a plurality of write cycles.

* * * * *